United States Patent [19]
Rogers et al.

[11] 3,861,720
[45] Jan. 21, 1975

[54] PLASTIC PIPE PRODUCT

[75] Inventors: Frank J. Rogers, Waka; Joe Mac Close, Spearman, both of Tex.

[73] Assignee: Rogers Sales & Service, Inc., Waka, Tex.

[22] Filed: Dec. 13, 1972

[21] Appl. No.: 314,683

Related U.S. Application Data

[60] Division of Ser. No. 180,023, Sept. 13, 1971, Pat. No. 3,758,255, which is a continuation-in-part of Ser. No. 55,113, July 15, 1970, Pat. No. 3,654,008, which is a continuation-in-part of Ser. No. 831,814, May 22, 1969, abandoned.

[52] U.S. Cl. .............................................. 285/156
[51] Int. Cl. ............................................ F16l 41/00
[58] Field of Search .......... 285/156, 155, 160, 423, 285/150

[56] References Cited
UNITED STATES PATENTS
| | | | |
|---|---|---|---|
| 2,040,628 | 5/1936 | Recker | 285/156 |
| 3,654,008 | 4/1972 | Rogers et al. | 156/152 |

FOREIGN PATENTS OR APPLICATIONS
| | | | |
|---|---|---|---|
| 1,144,833 | 10/1957 | France | 285/156 |

*Primary Examiner*—Geo. V. Larkin
*Attorney, Agent, or Firm*—Ely Silverman

[57] ABSTRACT

Plastic tee assembly comprising a hollow conduit with a sput projecting laterally from and connected by a softly curved surface to said conduit, and a saddle and stem unit, the saddle firmly attached to the sput and one side of the conduit; the saddle and stem unit is less flexible than the remainder of the tee assembly.

4 Claims, 27 Drawing Figures

PATENTED JAN 21 1975

PATENTED JAN 21 1975

FIG.19 ial sectional view of the tee assembly 100 along section
PLASTIC PIPE PRODUCT

CROSS REFERENCE TO RELATED APPLICATIONS

This application is a second division of our co-pending patent application Ser. No. 180,023 filed Sept. 13, 1971, now U.S. Pat. No. 3,758,255 issued Sept. 11, 1973; said patent application Ser. No. 180,023 being a continuation-in-part of our therewith co-pending application Ser. No. 55,113 filed July 15, 1970, now U.S. Pat. No. 3,654,008, issued Apr. 4, 1972, said application Ser. No. 55,113 being a continuation-in-part of our earlier application Ser. No. 831,814 filed May 22, 1969, and now abandoned. The first division of application Ser. No. 180,023 was filed Dec. 1, 1972, as U.S. Pat. application Ser. No. 311,291 and issued on May 7, 1974 as U.S. Pat. No. 3,809,737.

BACKGROUND OF THE INVENTION

1. Field of the Invention

A branched pipe joint, including a short connector integral with the conduit wall.

2. Description of the Prior Art

The prior art has not provided a feasible and reliable tee connector for use with large diameter plastic irrigation pipe; such developed looseness or were so rigid as to develop failures elsewhere in the system of which such connectors were a part. This invention provides reliable plastic tees and crosses that utilize the flexibility and strength of the pipe in a manner not heretofore utilized and apparatus for their manufacture.

SUMMARY OF THE INVENTION

A closely fitted and angled compound plastic pipe connector structure allows flexing of the conduit wall not fixed to and stiffened by its saddle and so provides increased impact strength in line parallel to the branch line. The protrusion of a portion of the skin of the main line pipe into the branch line provides mechanical co-operation of conduit wall and its saddle. The differing directions of strain on the different joined laminae forming the product improve the strength of the product.

The apparatus for manufacture of such plastic connector components provide cooperation of a fixed main frame assembly and a movable frame assembly supported thereon to not only maintain the orientation of the component parts of the product during their manipulation by selectively contacting or gripping only their stronger portions but also provides for the rapid quenching of the components immediately after formation by quenching the components while in the forming structure in which each such component is formed.

BRIEF DESCRIPTION OF THE DRAWINGS

FIGS. 1–11 show stages in the sequence of operation of apparatus for the components of the tee assembly 100. The finished tee assembly is shown in FIGS. 12 and 13; its separate components are in FIG. 11;

FIG. 4 is a pictorial broken away front view of the apparatus 96 illustrating that apparatus during a step of the operation of forming the conduit portion 90 of the assembly 100, this step following the step shown in FIG. 3;

FIG. 5 is a oblique end view, along direction of arrow 5A of FIG. 4, of the apparatus 96 in zone 5A of FIG. 10A; FIG. 5 is a partly broken away to illustrate the seat jig assembly 206, with tank 125 filled with water and vertical guide frame assembly 142 raised to bring lower horizontal cantilever arm 134 above water level;

The lines A, B and C of FIGS. 7 and 8 are parallel vertical lines drawn on the outer wall of stem unit 50; FIG. 9 shows their disposition after forming and stretching as herebelow described;

FIGS. 7, 8 and 9 are directed to details of structure of the conduit unit 72 and stem unit 50 and changes in unit 50 to form the shaped stem unit 73 therefrom;

FIGS. 10A, 10B and 10C are sequential oblique top and side views along the direction of arrow 10E of FIG. 3 of apparatus 96 during its operation but with the sput drawing subassembly 48 removed for clarity of representation; FIG. 10A shows the movable piston assembly 163 and the fixed piston assembly 137 both in their raised position for the operation to form the stem unit 50 into the shaped stem unit 73;

FIG. 10B shows the movable piston assembly 167 in its lowered or extended position and the fixed piston assembly 137 in its raised or contracted position; FIG. 10C shows both movable piston assembly 167 and fixed piston assembly 137 in their lowered or extended positions;

FIG. 10D is a diagrammatic showing of the hydraulic connections of components of the hydraulic power and switching assembly 120.

DESCRIPTION OF THE PREFERRED EMBODIMENTS

Figure 11:
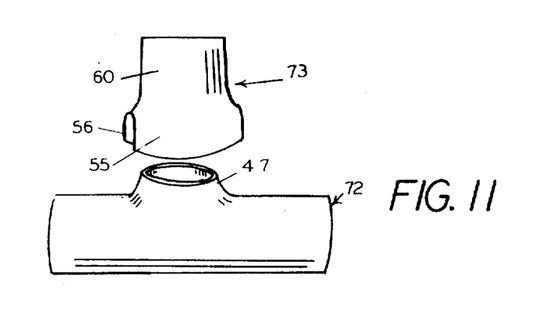
FIG. 11 is a diagrammatic side view of the shaped conduit unit 72 and shaped stem unit 73 of the unassembled tee assembly 100 immediately prior to being assembled.

The tee shaped assembly 100 (shown in FIG. 12) which is a product of this invention comprises a conduit portion 90 and a stem portion 80 operatively joined. The separate components of the tee assembly (shaped conduit unit 72 and shaped stem unit 73) of which the tee assembly 100 is formed are separately shown in FIG. 11.

The characteristics of these components and method by which these components are formed and brought together are designed to improve the utility of the completed structure.

The tee manufacturing apparatus 96 comprises a fixed main frame and tank assembly 131, a movable frame assembly 140 and a hydraulic power switching assembly 120 in operative combination.

The fixed frame assembly 131 comprises a tank 125, vertical mast 132, support arms 133-136, and a fixed piston assembly 137.

The movable frame assembly 140 comprises a top horizontal cantilever arm 141, a movable piston assembly 167, a movable guide frame assembly, 142, a bottom horizontal cantilever arm 148, a sput drawing assembly 48 and a pipe support seat assembly as 61 or 206.

The movable frame assembly 140 is by one part thereof operatively connected to piston assembly 137 and another part slidably mounted on the fixed frame assembly 131 and moved up and down on that frame assembly 131.

The fixed frame assembly tank 125 is an upwardly open rectangular tank: it has a plurality of imperforate front and rear steel walls, 126A and 126B, and left and right steel end walls, 127A, 127B and a steel bottom 128 operatively joned in watertight fashion and enclosing a body of liquid 129 in its normal operation, as in FIG. 3, 10A, 10B and 10C.

A rigid steel I-beam 132 is firmly attached to the tank bottom 128 and its rear wall: it extends upwardly beyond the top of the tank 125: it is composed of a steel web 170 and a steel right flange 175 and a steel left flange 176: left flange 176 has a front flange portion 174 and a rear flange portion 172. Right flange 175 has a front flange portion 173 and a rear flange portion 171. These web and flange portions 170-176 are firmly joined together for the full length thereof in conventional manner of I-beams. Centrally located left and right rigid steel diagonal supports 133 and 134 and laterally located left and right rigid lateral steel supports 135 and 136 act as guying and reinforcing members to maintain the position and vertical orientation of the mast 132.

A fixed piston assembly 137 comprises a rigid vertically extending piston chamber wall 138, firmly attached at its rear near to its top and near to its bottom to the front of the mast 132. A slidably movable piston 118 within the chamber wall is firmly attached to a rigid vertically extending piston shaft 139. The bottom end of the piston shaft 139, also used as a drawbar, is firmly attached as by a bolt 154 in a yoke 152 to a lug 153 on the upper cantilever arm 141. Movement of the shaft 139 accordingly moves the vertical guide frame assembly 142 upward and downward parallel to and along the length of the mast 132 below the bottom of piston chamber wall 138 to the length of extension of the shaft 139.

The guide frame assembly 142 of the movable frame assembly is composed of a vertical left vertical side plate unit 182, right vertical side plate unit 192 and an upper roller unit 183 and a like lower roller unit 184. The left vertical side plate unit 182 comprises a pair of parallel rigid vertical bars, front left vertical bar 185, rear left vertical bar 186 and rigid vertically spaced apart horizontal bars, as 187, firmly joining them. The right vertical side plate unit 192 comprises a pair of parallel rigid vertical bars, front right vertical bar 195 and rear right vertical bar 196 firmly held in spaced apart relation by rigid horizontal vertically spaced apart bars as 197, 197' and 197".

The upper wheel or roller unit 184 is structurally the same as lower wheel or roller unit 183. Roller unit 184 comprises a front roller shaft 189 and a rear roller shaft 190. Each front roller shaft as 189 is firmly attached at its left end to the front left vertical bar 185 and at its right end to the front right vertical bar 195. Each rear roller shaft, as 200, is firmly attached at its left end to the rear left vertical bar 186, and is firmly attached at it right end to the rear right vertical bar 196.

A front roller 199 is rotatably supported on the front roller shaft 189 and a rear roller 200 is rotatably supported on the rear roller shaft 190. Each of the rollers, as 199 and 200 is shaped in horizontal cross section, as in FIG. 10E, like a truncated cone. Front roller 199 conical side surfaces slidably fit between the front flange portions 174 and 173 and its cylindrical end surface rolls on the front surface of the web 170, while the conical side surface of each rear roller as 200 slidably fits between flange portions 171 and 172 and the cylindrical peripheral or end surface thereof rolls on the rear surface of web 170.

The upper ends of the bars 185, 186, 195 and 196 are firmly joined together and located by rigid flat bars or straps such as 187 and 197 at the bars' lower ends by fork 151 and unit 183 shafts as 189' and 190'. Rollers 199' and 200' are supported on such shafts, 189' and 190' in unit 183 as in unit 184. Unit 183 guides frame assembly 142 at its top as does unit 184 at its bottom.

An upper horizontal cantilever arm 141 extends forward from the top end of the guide frame assembly 142 and is formed like a rigid fork or letter "Y": the rear, forked, branch portion 151 is firmly attached to the top of end of each of vertical bars arms 185, 186, 195 and 196 and holds them in place relative to each other and to the I-beam 132 for the guiding and rolling action of unit 183 on I-beam 132.

A movable piston assembly 167 comprises a vertically extending rigid right cylindrical piston chamber wall 168, the bottom portion of which wall is rigidly attached to the front end of arm 141. A straight rigid cylindrical piston arm 39 is firmly attached to piston 119 which slidably fits within chamber wall 168: arm 39 is controllably extensible from the chamber wall 168 and arm 141 on actuation by the hydraulic control switch 114 of hydraulic switch assembly 120. The arm 39 is used to press stem unit 50 downward in operation shown in FIGS. 7, 8, 9, 10A and 10B and is used to draw mandrel 33 upward in the operation of forming the sput 47 shown in FIG. 3.

Figures 8, 9:
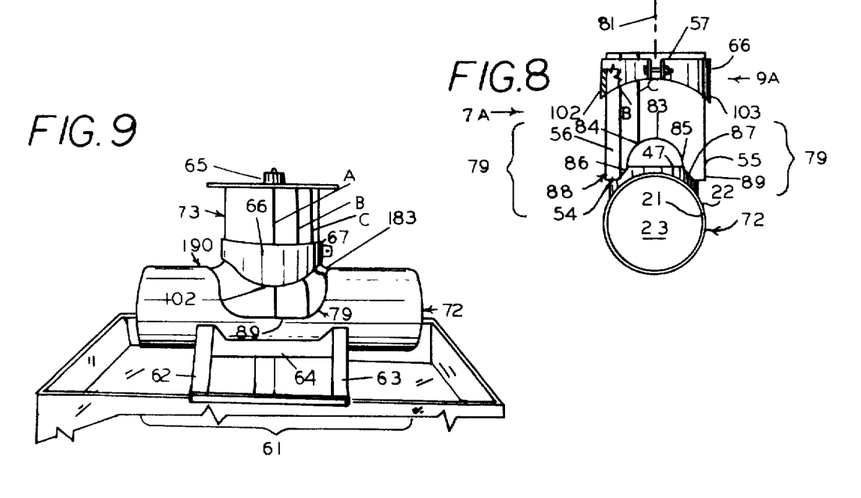
FIG. 8 is a frontal view along the direction of the arrow 8A of FIG. 7.
FIG. 9 is a side view in direction of arrow 9A of FIG. 8 showing a stage in the formation in the tee assembly 100 subsequent to that shown in FIG. 8.
Figures 10A, 10D:
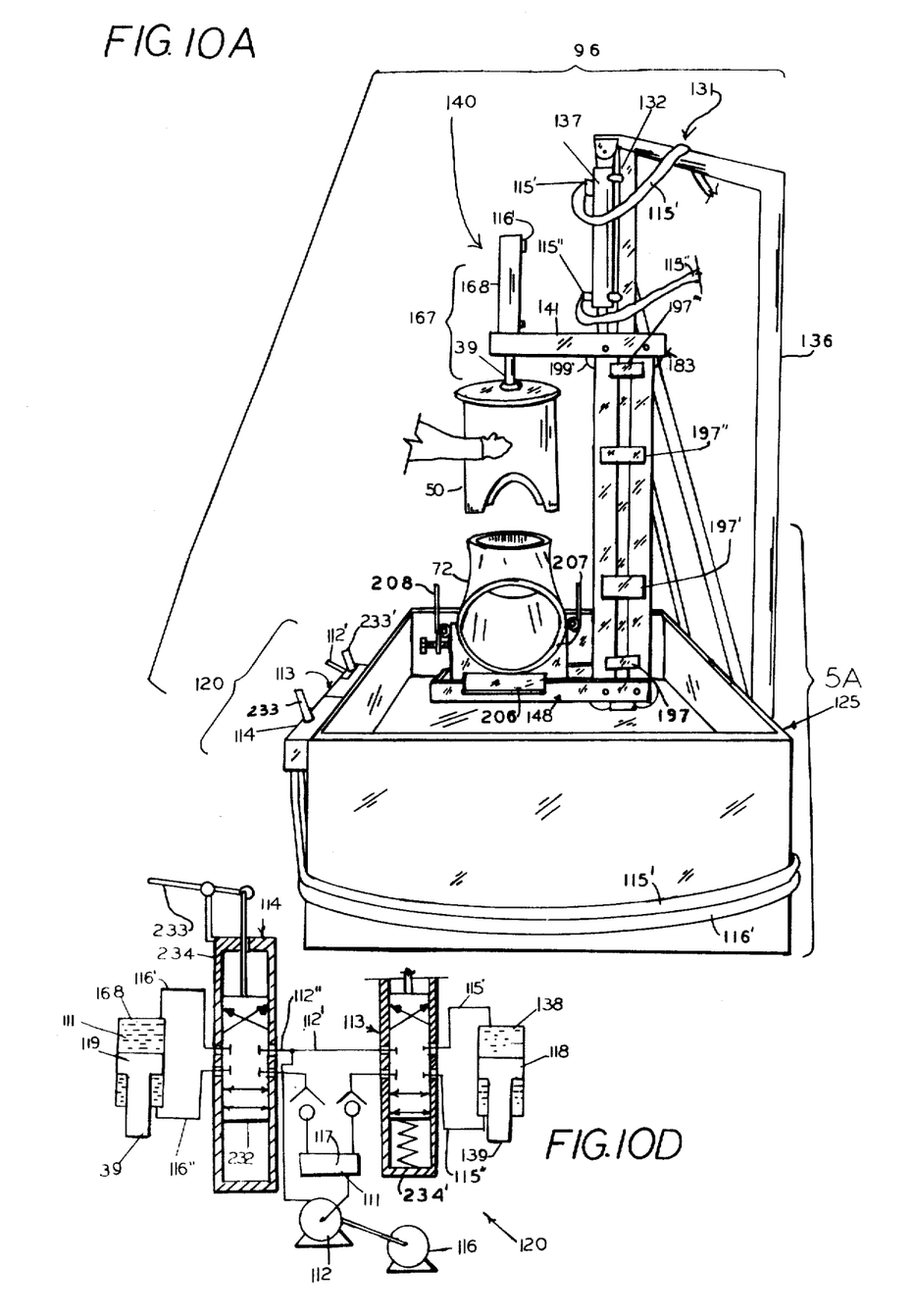
Figure 10B:
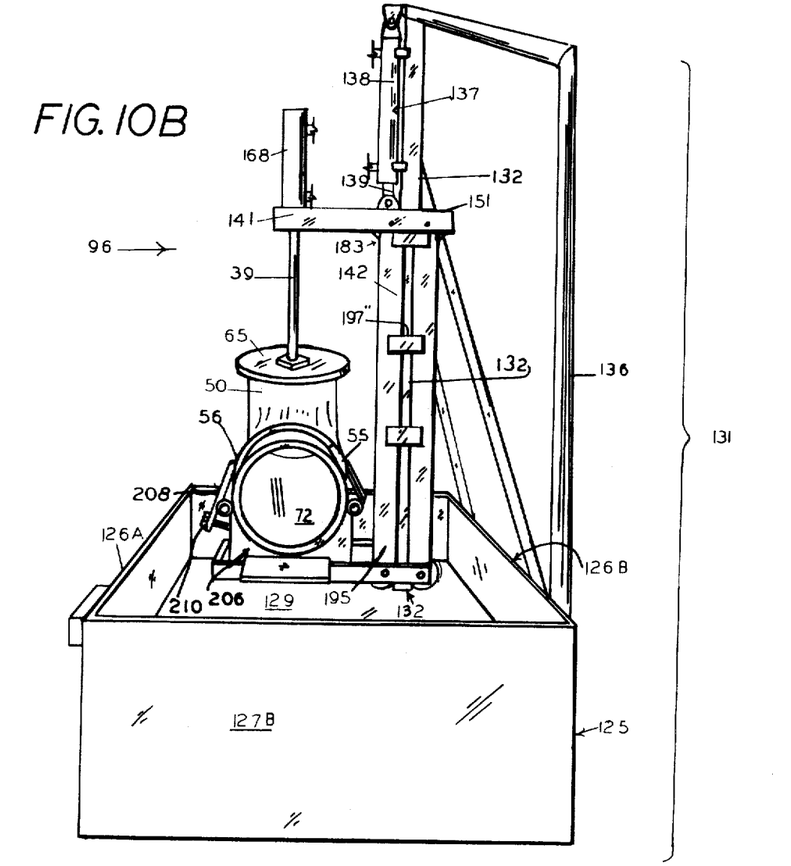

A rigid circular plate, 65, with a horizontal flat bottom surface is removably yet firmly attached to the bottom of the shaft 39 for pressing stem unit downward as shown in FIGS. 9, 10A and 10B. Shaft 39 and piston plate 65 (or mandrel 33) are moved up to and down from the chamber within wall 168 by the piston in chamber 168.

A rigid sput drawing frame arm 98 (shown in FIGS. 3 and 4) extends horizontally for equal distances leftward and rightwards of the front end of upper horizontal cantilever arm 141. Diagonal rigid strut arms 193 and 194 are each firmly attached at their lower end to the lateral ends of the arm 98 and, at their upper ends, to the top of the piston chamber wall 168.

Figure 3:
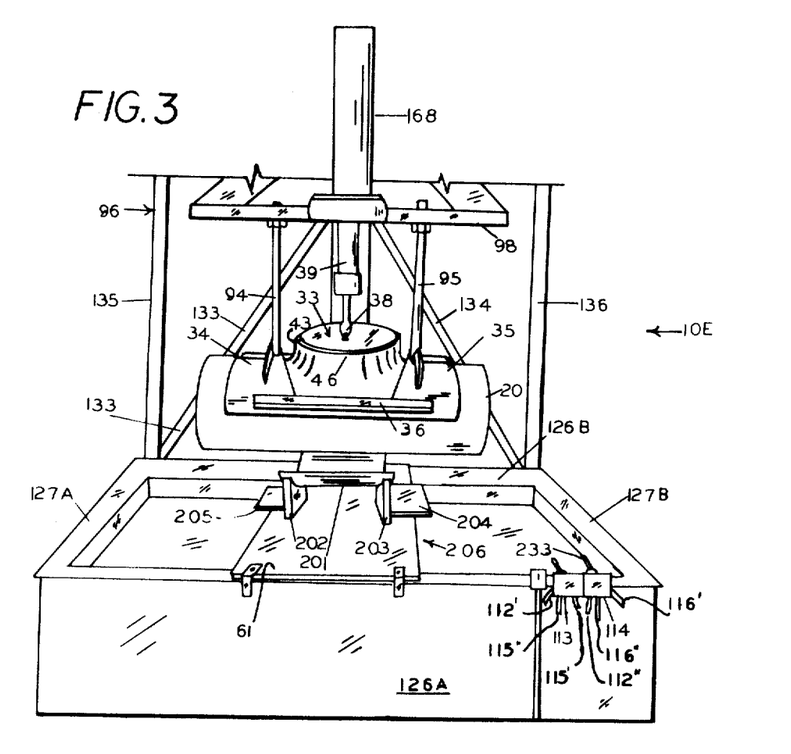
FIG. 3 is a front view of a portion (3A) of the apparatus shown in FIG. 4 with a variant of the seat jig assembly (61'); in the step of the process subsequent to that shown in FIG. 2 in forming the conduit portion 90 of the tee assembly.

Rigid downwardly concave seating elements 34 and 35 (shown in FIGS. 3 and 4) each have seating surfaces that are cylindrical in shape, equal in size and shape and held co-axial and longitudinally spaced apart by rigid horizontally extending rigid front connecting element 36 and rear connecting element 37. Each of rigid vertically extending left and right arms 94 and 95 respectively, extends from and each is rigidly and firmly attached at its top end to the frame arm 98 and at its bottom end is firmly and rigidly attached to a seating elements, as 35 and 36, respectively, as shown in FIGS. 3 and 4.

Figures 4, 5:
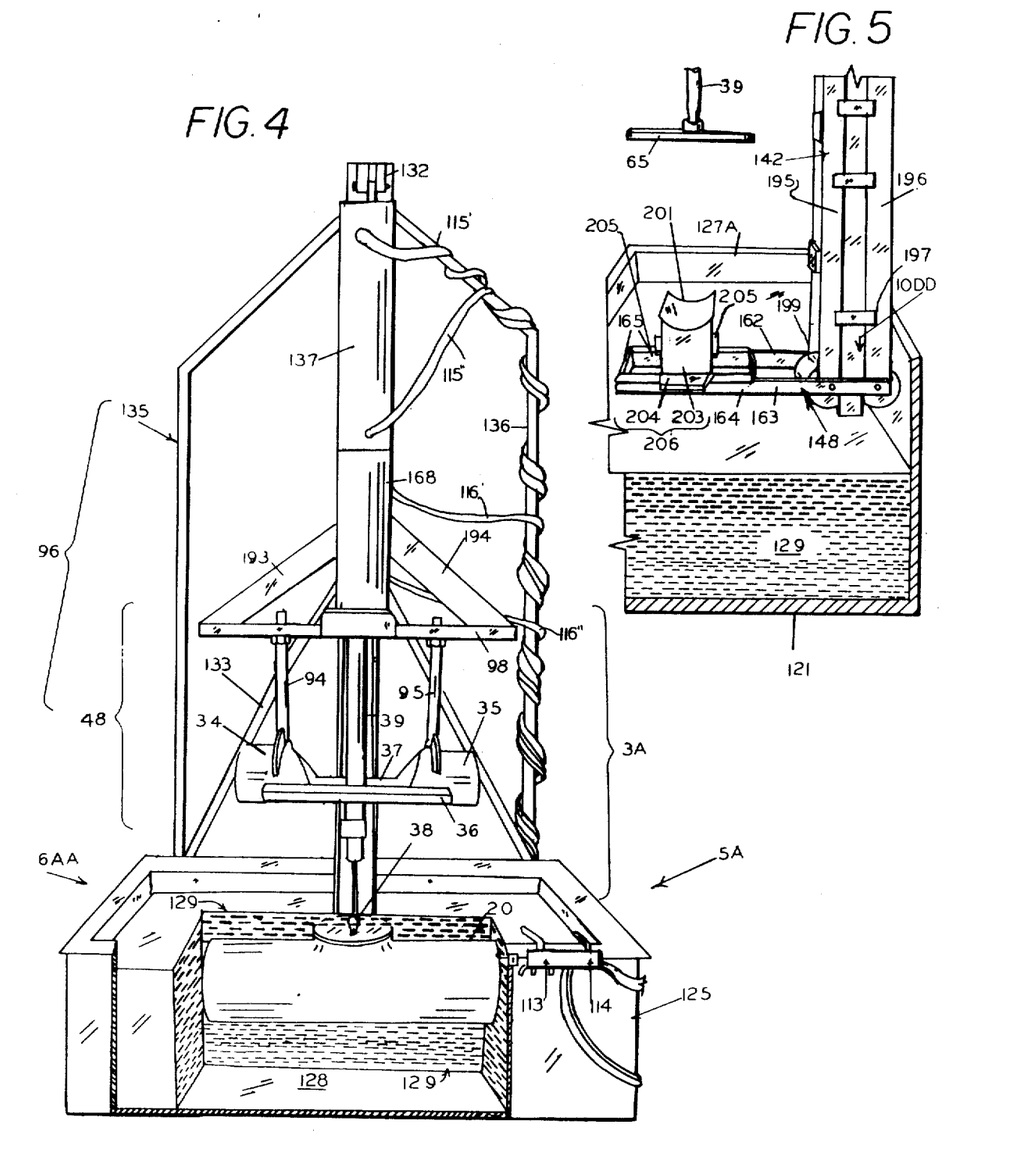

A cylindrical mandrel as 33 is removably yet firmly attached to the bottom of rod 39 by eyebolt 38 for drawing out and forming the sput portion 47 of the stem unit 50 as shown in FIG. 4 on movement of shaft 39 upward.

The sput drawing subassembly 48 comprises members 34, 35, 36, 37, 94, 95, 98, 193 and 194 and is attached to and supported on the upper cantilever arm 141 and is attached to the movable piston chamber wall 168: the sput drawing assembly may be removed from the apparatus 96 for purpose of operating to perform only the process of forming the shaped stem unit 73 from the stem unit 50, as illustrated in FIGS. 7, 8, 9 10A, 10B and 10C.

A lower rigid horizontal cantilever arm 148 is firmly attached to and extends forward from the lower end of the guide frame 142 and is formed like a letter "H" with a rigid left side member 162, a rigid right side member 163, rigid center transverse member 164 and an end transverse member 165 firmly attached together and to bars 185, 186, 195 & 196. With assembly 206 on arm 148, seat jig assembly 206 is composed of a rigid upwardly concave seat 201 fitting bottom of shaped conduit unit 72 and 20. Seat 201 is firmly attached at its ends to rigid vertical supports 202 and 203; supports 202 and 203 are attached to and supported by laterally extending left and right lugs or ears, 205 and 204; ears 204 and 205 are removably supported on arms 163 and 162 of arm 148; the seat 201 of jig 206 supports shaped unit 72 during formation of the stem unit 80. (Jig 206 may be removably supported above the top of tank 125 by a removable rigid plate, as 61' which extends from and is attached to front wall 126A and rear wall 126B, as shown in FIG. 3.)

Figures 6A, 6B, 7:
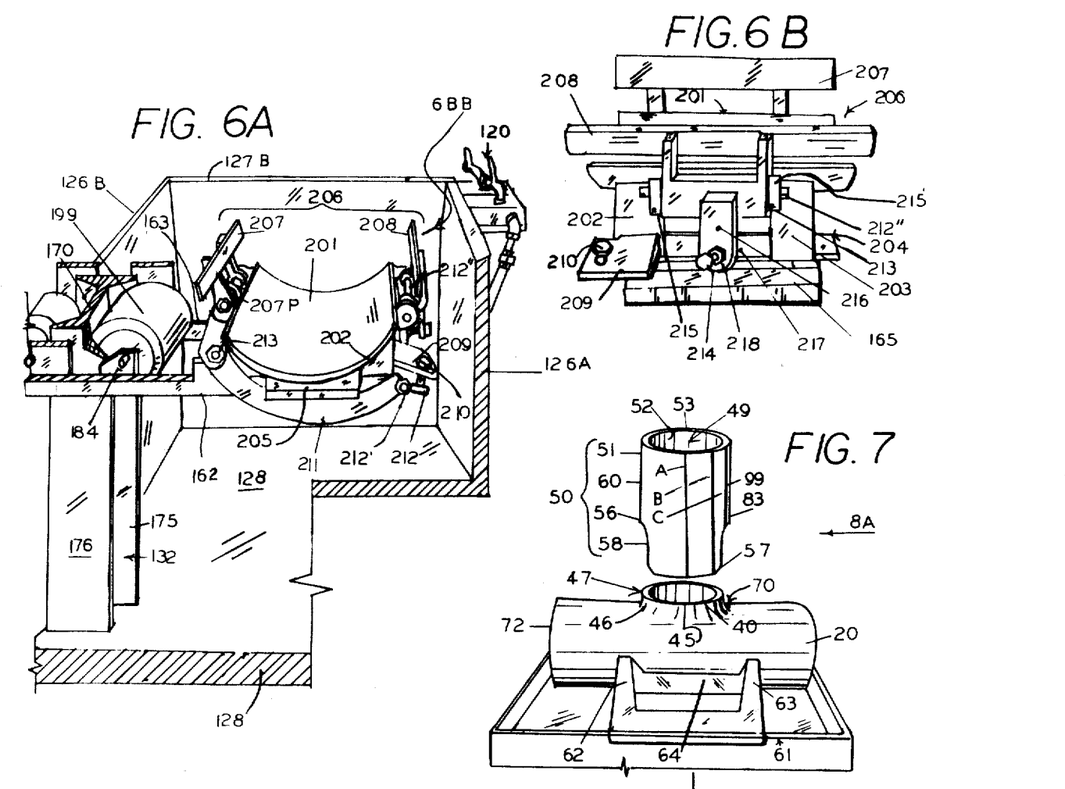
FIG. 6A is an oblique view of a portion of apparatus 96 along the direction of arrow 6AA of FIG. 4 and is partly broken away to show variant of the seating jig assembly 206, with tank 125 empty.
FIG. 6B is an oblique view of seat jig assembly 206 along direction of arrow 6BB of FIG. 6A.
FIG. 7 is a side view of stem unit 50 and shaped conduit unit 72 in a first stage of their joining taken along direction of arrow 7A in FIG. 8.

In an improved version of the conduit seat jig assembly 206, rigid rear and front clamp plates 207 and 208, respectively are pivotally connected to support plates 203 and 202 (see FIGS. 6A, 6B). An ear 209 on plate 202 supports a threaded drive bolt 210 which bolt engages an ear 212 of crank arm 211. Ear 212 is adjusted by bolt 212' on forward end of arm 211. Arm 211 is adjustably yet firmly attached to and extends from a crank arm 213; arm 213 is located below the pivot bar 207P for plate 207 and arm 211 pivots around that bar 207P. Accordingly, movement of bolt 210, as by an impact wrench, drives plate 207 toward plate 208.

Front clamp plate 208 is pivotally connected by a pivot bar 212'', through lugs 215 and 215', to supports 202 and 203. A threaded bolt 214 engages a threaded nut 218 which is firmly attached to an arm 216 on opposite side of pivot bar 212'' from plate 208, pivotally attached to bar 212'' and firmly attached to plate 208. The free end of bolt 214 engages a rigid bar 217 which bar (217) is firmly attached to plates 203 and 202. The turning of head of bolt 214 in one direction moves the clamp plate 208 inwards toward plate 207, while movement of the bolt in the other direction moves the plate 208 away from plate 207 and support 201. The plates 207 and 208 accordingly serve to hold the bottom edges 88 and 89 of the stem portion 80 toward the shaped conduit unit 72 after the formation of those portions of stem unit 50 on the unit 72 as shown in FIGS. 8, 9 and 10B.

In the hydraulic power and switch assembly 120, a source of hydraulic liguid 111 is operatively connected to a pump 112. The pump 112 is powered by a conventional electric motor 116 and fed from hydraulic fluid sump 117. Valve 113 for fixed piston assembly 137 and valve 114 for movable piston assembly 167 are operatively connected to pump 112 by lines 112' and 112'', respectively (as shown in FIG. 10D).

Hydraulic control valve 113 is operatively connected to piston assembly 137 by conventional hydraulic lines 115' and 115'' and hydraulic control valve 114 is operatively connected to piston assembly 167 by conventional hydraulic lines 116' and 116''.

Plates 207 and 208 may also be hydraulically controlled.

As mast 132 is vertical and the cylinder chambers 168 and 138 are each vertical and moved parallel thereto the forcing of stem unit 50 and forming of the shaped stem unit 73 over the shaped conduit unit 72 as shown in FIGS. 8, 9, 10A and 10B is accomplished symmetrically as well as that the sput 47 is drawn perpendicularly to the axis of pipe element 20 in the operation shown in FIG. 4 and delicately as below described.

Figure 1:
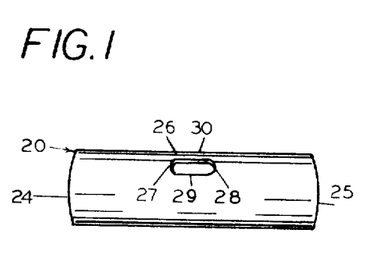
FIG. 1 is a side and top oblique view of the pipe element 20 used to form conduit portion 90.
Figure 2:
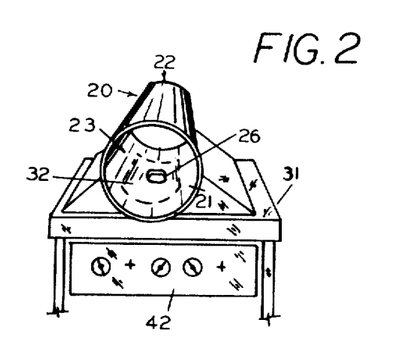
FIG. 2 is a subsequent stage in the formation of the conduit portion 90.

In the manufacture of tee assembly 100 a cylindrical plastic pipe element, 20 (shown in FIG. 1), of high flexural strength having an inner wall surface 21 and an outer wall surface 22 (shown in FIG. 2) outlining a cylindrical chamber 23 is cut to provide a hole 26 (shown in FIG. 1) therein which hole is elongated in direction of the axis of the pipe element 20. The particular pipe shown is a P.V.C. polyvinyl chloride Type 1 grade 1 (by ASTM Spec No. 1784) with a 10 ¼ inches o.d. and a ¼ inch wall thickness. The particular length from the left end 24 of the pipe element 20 to the right end 25 is not critical but is usually, for a 10 inches diameter pipe 20, about 3 feet. The distance (5 inches) across the left edge 27 to the right edge 28 (as shown in FIG. 1) of the hole is greater than the length (2 inches) from the front edge 29 to the rear edge 30 of hole 26. A portion of the pipe element 20 in zone 32 with such hole 26 therein is then heated to a temperature substantially in excess of the distortion temperature (at 66° F.), approximately 250° F. in this particular embodiment of process, as shown in FIG. 2, in the zone 32 while such pipe element is supported in a jig 31 (shown in FIG. 2). The temperature in such zone 32 is closely controlled, as by thermal controls as 42 on the jig 31, and the heating brings the entire wall thickness over that area of the pipe element which the subsequent drawing is intended to affect to a uniform temperature; the heated area is as large as and substantially the same as the wall surface area encompassed between the drawing seat elements 34, 35, 36, 37 and shown in FIGS. 3 and 4. Following such heating and while the thus heated portion of the pipe wall is above its distortion temperature a. the pipe element 20 is supported in a jig, as 61 or 206 longitudinally extending parallel to the axis of pipe element 20 with elongated hole 26 facing upwards and b. concave seating elements 34 and 35 that conform, i.e. have the same inner diameter as the outer diameter of the outer wall surface 22 of pipe element 20 are placed (by vertically extending arm 94 and 95 of an assembly 96 to which such arms and drawbar 39 are attached) against the upper outer wall surface 22 of the pipe element 20 on either side of and equispaced from the elongated hole 26 as shown in FIG. 3 and c. a relatively flat, extremely rigid circular metal mandrel 33 with a smooth rounded edge 43 and an eyebolt 38 located in the geometrical center of the top surface thereof (shown in FIG. 3) is placed into the chamber 23 and the eyebolt 38 on the mandrel is connected to a drawbar 39 through elongated hole 26, and d. rigid longitudinally extending connecting elements as 36 and a rear element 37 are firmly attached to and, with arms 94 and 95, hold the seating elements 34 and 35 in fixed relationship across the periphery of the circular hole 40 formed while drawing the mandrel 33 slowly and evenly through the elongated hole 26 by applying hydraulic fluid to chamber 168 and driving the bar 39 and mandrel 33 slowly upward and forming the sput 47 slowly to avoid tearing while the seats 35 and 36 hold the remainder of tube 20 in place.

The axis of the drawbar 39 is vertical and intersects the longitudinal axis of the pipe element 20 while the top surface of the mandrel is horizontal.

The top to bottom thickness of the mandrel is sufficiently substantial and its edge smoothly curved to provide for a smooth displacement of the heated plastic in zone 32. The curvature of such edge is set out in Table II herebelow. The outer diameter of the mandrel is that of the intended internal diameter of the stem unit 80 (shown in FIG. 12) desired to be attached to the pipe element 20 and the sput 47 less the thickness of the walls of the sput 47. The diameter of the mandrel may be as large as the internal diameter of the pipe element 20 although usually a diameter of the mandrel is chosen to be smaller than the diameter of the pipe element as 20.

Following drawing of the mandrel through the elongated hole 26 and formation of the circular hole 40 and neck zone 46 (shown in FIG. 3), the bar 39 is extended by actuating switch 113 to drive hydraulic fluid into the top of chamber 138 and drive piston 118 and its shaft 39 downward until, as shown in FIG. 4 mandrel 33 and sput 47 and formed pipe element 20 are immersed in the body of liquid 129 in the vat 125 together.

The pipe element 20 with the mandrel 33 still therein is thereby immediately placed into the tank or vat 125 filled with a volume 129 of cool (50° – 60° F.) water and in this vat the entire structure of mandrel plus pipe element 20 is uniformly yet rapidly cooled below its distortion temperature and thus formed into rigid stable structure at room temperature (70° F.). The particular size of elongated hole 26 used provides that the edge 45 of the sput 47 produced by this drawing action forms a smooth circular opening 40 (shown in FIG. 7).

TABLE I

Internal convex curvature of sput of different size stems

| o.d. of stem | Radius of curvature |
|---|---|
| 12" | 1⅛" |
| 10" | 1" |
| 8" | ⅞" |
| 6" | ⅝" |
| 4" | ¼" |

TABLE II

MANDREL DIMENSIONS

| Diameter of Mandrel | | Mandrel Thickness | Radius of curvature at Edge of Mandrel |
|---|---|---|---|
| Nominal | Actual | | |
| 8" | 7⅝" | 3⅝" | ⅛" |
| 10" | 9⅝" | 3⅝" | ⅝" |
| 12" | 11⅝" | 4⅝" | 7/16" |

The mandrel 33 in passing through the elongated hole 26 as above described thus forms a sput 47 with an opening 40 in shape of a circle with an exterior diameter substantiallly the same as the interior diameter of the stem portion 80 of tee assembly 100. Also the portion of the pipe element wall then deformed is strengthened transversely to the longitudinal axis 91 (shown in FIG. 12) of the conduit portion 90 by the stretching effected by the formation of the sput 47.

A stem portion (80) that forms a smooth and substantially perfect fit with the sput 47 in order to form a strong and complete as well as leak-proof attachment between such stem portion and the pipe portion 90, by perfectly mating surfaces, is thus achieved according to this invention and matching surfaces are economically and reliably provided at the interior bottom surface of the leg portion 79 (shown in FIG. 8) of the stem unit 50 so as to form a smooth match with the sput portion 47, (shown in FIG. 7) transition portion 70 (shown in FIG. 7) and part of wall surface 22 of the conduit portion 90 of the tee assembly 100. The height of the sput thus formed, that is, the vertical distance from the top of surface 22 of the pipe element 20 (shown in FIG. 7) to edge 45 of circular hole measured along the vertical axis 81 (shown in FIGS. 8 and 13) of the sput portion 47 is 2 inches. This is adequate length or height to provide positive location of the collar 66 (shown in FIGS. 8 and 9) and the unit 50 during the movement of the unit 50 downward over the sput portion 47, transition portion 70, and the wall surface 22 as well as being sufficiently high to mechanically prevent the stem portion 90, in the finished configuration of the apparatus 100, from movement parallel to the longitudinal axis 91 of the conduit portion 90. At the same time the radius of curvature in the transition zone 70 between the pipe and the sput portion is sufficiently "soft", i.e. of a sufficiently large radius of curvature, to permit a smooth motion of the leg portions 55 and 56 during the downward motion of such legs over the top and sides of the shaped conduit unit 72. Such softness or gradualness of curvature is also essential for an extremely close fit and a uniformly distributed stretching of the portion of the stem portion 80 adjacent to the exterior of the complexly shaped transition portion 70 of the shaped conduit unit 72.

The stem unit 50 (shown in FIG. 7) which is formed into the stem portion 80 of the assembly 100, is a generally cylindrical tube with an upper body portion 60 and a bifurcated leg portion 79 (as shown in FIG. 8) so that it is, prior to its joining the shaped conduit unit 72, generally shaped like an inverted letter Y structure.

The stem unit 50 has a circular top edge 53 (as shown in FIG. 7) and an irregular bottom edge 54 (as shown in FIG. 8) a cylindrical outer wall surface 51 (shown in FIG. 7) and an inner cylindrical wall surface 52 (shown in FIG. 7) with a stem chamber 49 (shown in FIG. 7) therein.

The leg portion 79 comprises a right leg 55, a left leg 56, with right and left as shown in FIG. 8, and a front mouth 57 and a rear mouth 58. Mouth 57 is located to the front (as shown to the right in FIG. 7) between right leg 55 and left leg 56 and the rear mouth 58 is located to the rear, (i.e. to the left as shown in FIG. 7) between the leg 55 and the leg 56.

The mouth 57, as shown in FIG. 8, has a top edge 83, which is concave downward, and curved portions 84 and 85 to the left and right (left and right as shown in FIG. 8) respectively, which portions extend downwardly and outwardly from top edge 83 to a left front corner portion 86 and right front corner 87 respectively; rounded corners 86 and 87 outline the aid location of the bottom front edge of the legs 56 and 55 respectively. The bottom edge 88 (shown in FIG. 8) of the left leg 56 is accordingly joined at the left front corner 86 via the upward and inwardly extending left mouth edge 85 to the top mount edge 83 which in turn is continuous with the right rounded mouth edge 85 which extends downwardly and laterally to the right front corner 87 which is continuous with the bottom edge 89 of the right leg 55.

After
a. mechanical and thermal treatment of the pipe element 20 to provide the sput therein and thereby produce the shaped conduit unit 72 (the conduit portion 90 in completed assembly 100) and
b. formation of the unit 50, as above described, the unit 50 is then thermally and mechanically treated (using the intermediate shaped unit 72) to form the stem portion 80 of the tee assembly 100.

Prior to its location as shown in FIGS. 7, 8 and 9, the unit 50 which is about to be brought into contact with the sput portion 47 as shown in FIGS. 8, 10A and 10B has the leg portions thereof brought to temperatures above the transition temperature of the material used (PVC Type, Grade 1), but below fusion temperature thereof, by dipping for 30 seconds into a vat of glycerine at 300° F. This treatment is accomplished by holding the unit 50 vertically by supporting it from or near to its upper edge 53 and putting the lower edges of the leg portions into such vat and moving the unit 50 downward therein for immersion thereof to a point 99, (shown in FIG. 7) which point is at a height, measured from bottom edges 88 and 89 (shown in FIG. 8) about 2 inches higher than the point 83. Point 99 is the lowest point of the unit 50 which remains undistorted in the final position of the assembled portions 90 and 80. This gradual immersion of the leg portions and a small portion of the body of the unit tube 50 above the top of the mouths 57 and 58 raises the temperature of each such portion (prior to its contact with the conduit wall 22) above its transition temperature so that it will readily stretch; at the same time the temperature of these theretofore immersed portions of unit 50 is low enough to prevent any collapse and/or crinkling of the leg portions 55 and 56 and edges as they are moved downward as shown in FIGS. 7, 8 and 10A in contact with portions 46, 70 and 22 of intermediate unit 72 when they embrace and form a firm match and mechanical fit with the conduit wall surface 22, sput portion 47, transition portion 70 and surface 22 and permits slight stretching thereof to form an exact close fit with such portions 47, 70 and 22.

The vinyl polymer used is Type I, grade 1 rigid PVC (polyvinyl chloride) as defined by ASTM D-1784 with following (Table IV) characteristics, Type II, PVC and ABS polymer may also be used.

The particular exemplary plastic material described (Type I, grade 1, PVC) is illustrative, not limiting, of formulations that form into a pipe with engineering and physical properties as in Table IV, or such others are well known (e.g. at *Source Book of New Plastics*, Simonds 1961, Vol. 2, Reinhold Pub. Co., Table 2, page 165; page 84 of *Modern Plastics*, May 1965, Table 1, "Typical properties of plastic pipe materials") and the state of the art also permits of varying properties using the same polymer with variations in the content and composition of plasticizer, (e.g. "Formulating Plasticizer Blends by Master Charts," John McBroom, pages 145–146, January 1966, *Modern Plastics.*)

To form the unit 50 into the stem unit 73 which becomes portion 80, conduit unit 72 is located in a jig as 206 or jig 61 provided with a seat as 201, (shown in FIGS. 6A and 6B) or 62 and 63 conforming to bottom of wall surface 22 and joined by and to connecting pieces as 64 (shown in FIG. 9) and held in position thereby; such pieces as 64 extend longitudinally of the shaped conduit and are fixed to seats 63 and 72 as shown in FIG. 4. Seat 206 is described above.

After heating the leg portions 55 and 56 thereof as above described, and while such legs are at about 300° F, unit 50 is held as shown in FIGS. 8 and 10A with the central longitudinal axis 81 of chamber 49 vertical and in the center of circular hole 40 and intersecting the longitudinal axis 91. A collar 66 is then preferably applied around the body portion 60 (shown in FIG. 7) of the unit 50. Collar 66 is a rigid hollow circular ring flat at its top and 2 inches deep at its front (and rear) as shown in FIGS. 8 & 9 and a maximum of 4½ inches deep at center of its left and right sides 102 and 103

(shown in FIG. 8) It is formed of steel and has a smooth interior surface, with a diameter adjustable by adjustment ears and screw 67 (shown in FIG. 8). The interior surface of collar 66 is lubricated by the hot glycerin on the outer surface of stem unit 50 and smoothly fits the exterior surface of the stem unit 50 and forms a smooth slidable fit therewith during this forming operation. At the same time the interior surfaces of the leg portions 55 and 56 and of the mouths 57 and 58 are also covered with a thin but substantially complete layer of glycerin from the vat that remains adherent thereto in the stages of the process shown in FIGS. 7 and 8; such glycerin layer forms a smooth lubricant contact with the exterior surface of sput 47, transition portion 70 and the top of surface 22 of the shaped conduit unit 72 as legs 55 and 56 move thereover.

While the valve 113 maintains the vertical guide frame assembly 142 and the unit 72 supported thereon in elevated position above the body 129 of cool water in tank 125, the hydraulic control valve 114 is then actuated to drive the piston plate 65 slowly downward from the elevated position thereof shown in FIGS. 7 and 10A to the depressed position thereof shown in FIGS. 9 and 10B.

The flat bottomed piston 65 (shown in FIGS. 9 and 10a and 10B) then presses the top end of stem 53 of unit 50 vertically downwards so that the front and top edges of mouths 57 and 58 of stem unit 50 contact the cooled and rigid surfaces of sput 47, portion 70 and the top of surface 22 and are longitudinally stretched and spread apart as the legs 55 and 56 move downward over the cooled rigid outer wall surface 22 of the shaped conduit unit 72. Thereby the interior of such bottom surface of the shaped stem unit 73 (stem portion 80 in the tee assembly 100) exactly matches the exterior contour of the shaped conduit element 72 and is strengthened by concomitant stretching. The total time for such movement of edges 88 and 89 of stem unit 50 downward of 7 inches (i.e. 2 inches over the sput 47 and slightly less than 5 inches vertically downward from the top of the curved outer wall surface 22) is from 3 to 6 seconds. The speed of downward movement of the piston 65 is controlled accordingly and the upper, body portion 60 of stem unit 50 above point 99 is sufficiently rigid to keep the downwardly moving moving unit 50 moving with its longitudinal axis 81 perpendicular to the axis 91 of the shaped conduit unit 72. The stretching of the stem unit wall material (between surfaces 51 and 52 located between the top and side portions of mouths 57 and 58 (such as the wall portions which are near to but sideways of edges 84 and 85 and which are upwards of edge 83) which has been warmed and lubricated as above described, around and against sput 47 and transition portion 70 and top of surface 22 of shaped conduit unit 72 concomitant on the longitudinal (parallel axis 91) motion and spreading of the top and side edges of mouths 57, (to right in FIG. 9) and 58 (to left in FIG. 9) in contact with the rigid yet smooth outer surface of the sput portion 47, transition portion 70 and surface 22 not only provides a perfectly matching fit between such deformed stem unit wall material and portions 47, 70 and 22 of shaped conduit unit 72 but strengthens such stem unit wall material. Accordingly, only a loose sliding fit is required between the interior of collar 66 and the exterior of stem unit 50 while the legs 55 and 56 move downwards (as shown in FIGS. 8, 9 and 10B) over the shaped conduit unit 72.

The stem unit 50 is formed on the shaped conduit unit 72 within 60 seconds of when stem unit 50 is withdrawn from the vat in which the legs were rendered plastic and the stem unit 50 is maintained in a vertical position generally as shown in FIGS. 7, 8, 9 and 10A and 10B by the straight line motion of piston 65; the downward speed of movement of the stem unit 50 is sufficiently slow during the movement shown in FIGS. 7, 8, 9. 10A and 10B that the edges 88 and 89 completely match surface 22 and do not crack, and expand longitudinally only very slightly although there is much longitudinal distortion of the edges (as 183, 184, 185, shown in FIG. 12) of the mouths 57 and 58.

Figure 10C:
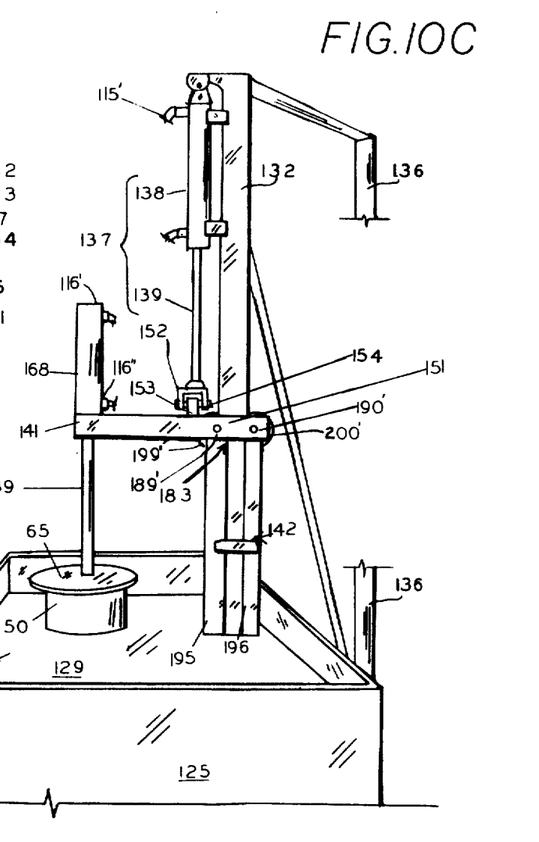
Figure 10E:
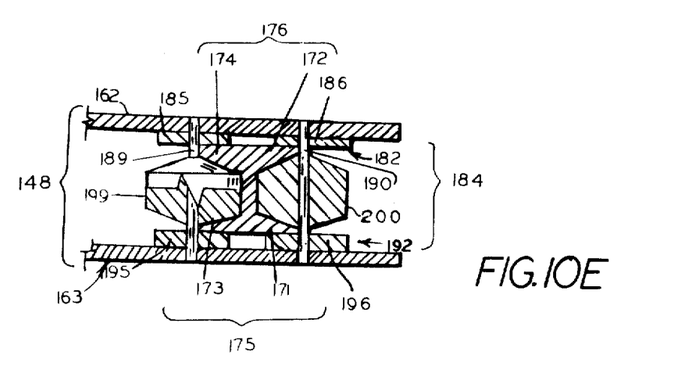
FIG. 10E is a transverse horizontal sectional view of a roller unit 184 at zone 10DD of FIG. 5.

Shaped stem unit 73 (formed as above described from stem unit 50 by molding on shaped conduit unit 72 and shaped conduit unit 72 (formed as above described from pipe element 20 with the mandrel 33) are then firmly held together by tightening screw 67 of collar 66 in the orientation of parts achieved as above described and shown in FIG. 9 or by tightening plates 207 and 208 of unit 206 against leg portions 55 and 56 and, while so held together, completely immersed in a liquid bath 129 of water at 50° to 80° F. in tank 125. Such immersion is effected within 60 seconds from the time that the leg portion of stem unit 50 had been withdrawn from its heating in the 300° F. liquid bath by actuating hydraulic valve 113 to extend piston shaft 139 and lower the vertical guide frame assembly 142 while leaving the piston assembly 137 in its extended position, as shown in FIG. 10C.

This immersion in the cooling water lasts, preferably, from three to five minutes and the former leg portions and the portions near the mouths 56 and 58 of the former stem unit 50, thereby, lose their capacity for plastic distortion and become stable and rigid in their form of a substantially exact match with the adjacent surfaces of shaped conduit unit 72. After such cooling, collar 66 and plates 207 and 208 are released from attachment to shaped stem unit 73 and, thereafter, the thus formed shaped stem unit separated from the shaped conduit unit 72 prior to and in preparation for the below described cementing operation for joining these two parts thus formed with similar matching surfaces.

All surfaces of the shaped stem unit 73 and of the shaped conduit unit 72 are then removed from liquid 129 in vat 125 and thoroughly cleansed of glycerine and cleansed in water and the portions of the surface of shaped conduit unit 72 and shaped stem unit 73 that had theretofore been in contact with each other as shown in FIG. 9 are coated with a primer to break the surface glaze and soften the surface. For this purpose the primer used is a solvent for the polyvinyl chloride which softens it, such as cyclohexanone, tetrahydrofuran, or methylethyl ketone; however tetrahydrofuran is preferred (and may have a trace of dioctylphthalate). Such softening of the surface that is to be cemented assures a better bond between the two separate pieces.

A standard formulation such as at Table III is used to bond the rigid polyvinyl chloride to itself, such formulation is brushed onto the previously softened surfaces.

TABLE III

| Parts by Weight | Material |
| --- | --- |
| 100 | polyvinyl chloride resin, medium |

TABLE III-Continued

| Parts by Weight | Material |
| --- | --- |
|  | molecular weight |
| 100 | tetrahydrofuran |
| 200 | methylethyl ketone |
| 1.5 | tin organic stabilizer |
| 20 | dioctyphthalate |
| 25 | methyl isobutyl ketone |

Figure 11B:
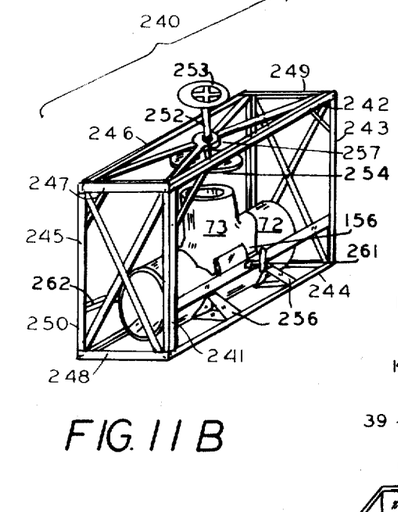
FIG. 11B is a glueing assembly therefor.

After the glue-coated pieces have been placed in a jig as in FIG. 11B pressure is applied to the top, bottom, and side of the stem portion to further assure that a proper adherence is affected. The completed tee assembly 100 is left in this jig from 2 to 4 hours and, at the conclusion of such period, the tee assembly 100 is removed from the jig.

Figure 12:
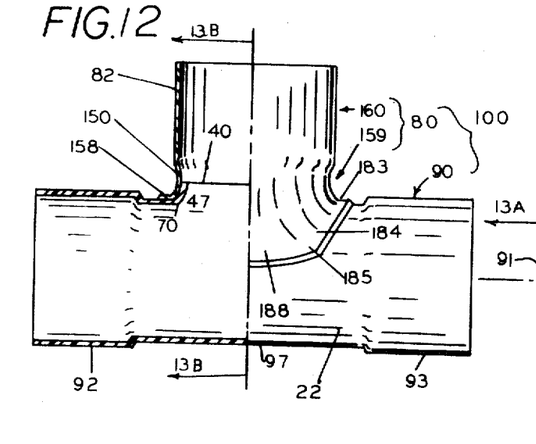
FIG. 12 is, in part, a side view along direction of arrow 12A of FIG. 13 and, in part, a vertical longitudinal sectional view of the tee assembly 100 along section 12B—12B of FIG. 13.
Figure 13:
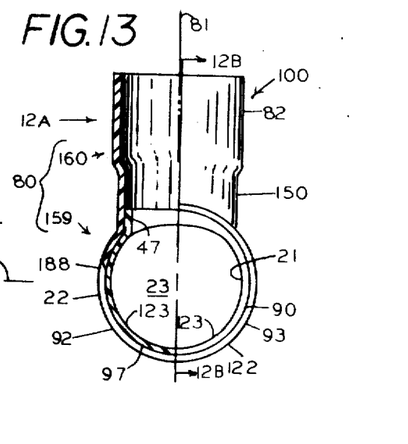
FIG. 13 is, in part, an end view of the tee assembly 100 taken along the direction of the arrow 13A of FIG. 12 and, in part, a sectional view along section 13B—13B of FIG. 12.

In the finished apparatus tee assembly 100 which is shown in FIGS. 12 and 13 the stem portion 80 is provided with an expanded connector portion or bell 82 (shown in FIG. 12) and the conduit portion 90 is provided with expanded bell portions 92 and 93 (shown in FIG. 12) at either end of central portion 97. In tee assembly 100, the stem portion 80 comprises a flange portion 159 and a cylindrical body portion 160 (shown in FIG. 7) firmly joined to each other. The flange portion 159 is firmly joined to the outer wall surface 22 of the conduit portion 90. The body portion 160 is a vertical, cylindrical portion with the somewhat larger bell 82 at the one end (or top) and a portion 150 (shown in FIG. 13) at the other end (therebelow). The portion 150 is the same diameter as the portion forming the body portion 60 in the stem unit 50 from which this stem portion 80 is formed.

Figures 14, 15:
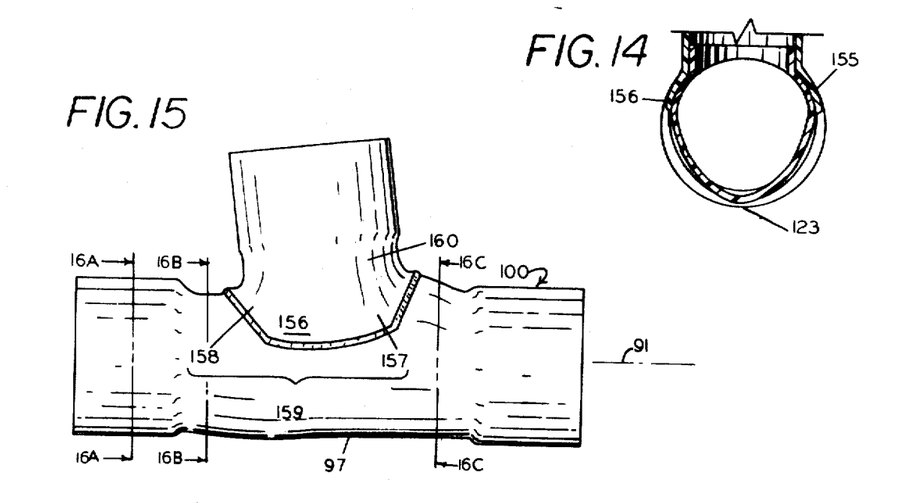
FIG. 14 is a sectional view of the tee assembly 100 taken along the section 13B—13B of FIG. 12 in a strained condition.
FIG. 15 is a diagrammatic side view of the tee assembly 100 as shown in FIG. 12 and exaggerated to show certain geometrical relationships of components of the tee assembly 100 during one of its stressed conditions.
Figure 16A:
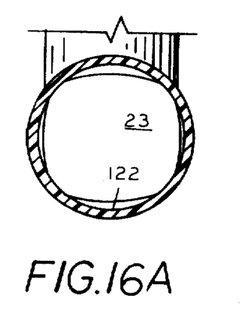
FIGS. 16A, 16B and 16C are, respectively, transverse cross sectional views along the sections indicated as 16A—16A, 16B—16B and 16C—16C of FIG. 15.
Figure 16B:
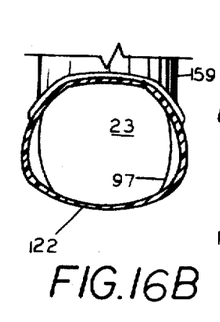
Figure 16C:
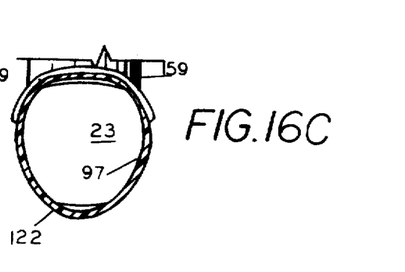

The flange portion 159 comprises a front lip portion 157, a rear lip portion 158, a left lip portion 156 (shown in FIG. 15) and a right lip portion 155 (shown in FIG. 14). There are firmly attached to each other. All portions of the bottoms of these flange portions are flush with and are firmly attached to the surface 22 and the sput portion 47 of the shaped conduit unit 72. The interior wall of the body portion 160 of the stem portion 80 is firmly adherent and cemented to the outer wall of the sput portion 47 of the conduit portion 90. This sput portion extends a few inches upward from the remainder of the cylindrical outer wall surface 22 of the conduit portion 90 and the sput portion is formed with a smoothly curved transition zone or portion 70 from the wall portion 22 to the opening 40 at the top of the sput portion 47 and work hardened parallel to axis 81.

The bottom edge 188 of the flange portion 156(and155) extends down to a level which is slightly above the central longitudinal axi 91 of the conduit portion 90.

The assembly 100 is an extremely sturdy structure not only due to the firm adhesive connection of the stem portion 80 to the conduit portion 90 but also, because of the mechanical cooperation between these two elements available, a strong mechanical connection of the stem relative to conduit portion 90 is provided by the sturdy structure of the sput 47 which projects into the stem portion 80 and mechanically locks it against motion parallel to axis 91 as well as having the adhesive connection therewith that is resistant to tensile stress along the direction of the vertical axis 81.

The stem portion 80 so located on the conduit 90 is firmly attached thereto, not only because of (a) adherent attachment of the outer surface 22 of the conduit and the transition portion 70 and sput 47 to the flange lips portions 155, 156, 157, 158 by the zone of adhesive that completely fills the space therebetween and is firmly adherent to lock such surfaces but also because (b) sput 47 projects sufficiently upward to firmly engage the mechanically prevent any movement of the flange lip portions 155, 156, 157 and 158 in a direction parallel to the longitudinal axis 91 of conduit portion 90 (which axis is also the longitudinal axis of the shaped conduit unit 72 as well as the longitudinal axis of the pipe element 20 from which the shaped conduit unit 72 if formed) and in a direction transverse to both the vertical axis 81 of stem portion 80 and the longitudinal axis 91, and because (c) the material of the transition and sput portion of conduit portion 90 is strengthened (by stretching) parallel to vertical axis 81 while (d) flange portion 159 of the stem portion is strengthened parallel to the longitudinal axis 91 and portions 80 and 90 are firmly joined by cementing to each other.

This structure permits not only some bending but also a resiliency that avoid any potentially harmful development of cracks at high stress points. As illustrated in FIG. 14, the bottom portion 122 of the wall 123 of the conduit portion 90 may be deformed because of water hammer effects in an irregation system as 110 (shown in FIG. 17).

Figure 17:
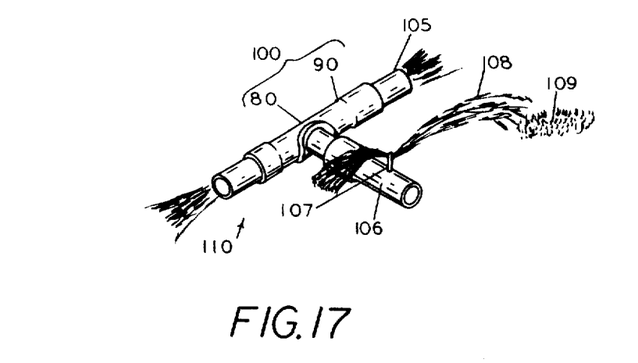
FIG. 17 is a diagrammatic representation of an irrigation system of which tee assembly 100 is a connector part.

As irrigation system 110 is generally shown in FIG. 17 wherein a main line 105 is continuous with the longitudinal axis 91 of the conduit portion 90 of the tee assembly 100 while a branch line 106 is coaxial with the axis 81 of the stem portion 80 and sprinklers 107 sprinkling sprays of water 108 to a field 109 are supplied by such branch lines 106. In such a situation, therefore, a water hammer effect as might otherwise provide too rapid a shock to the wall 122 on the opposite of the tee assembly 100 to which the branch line 106 is attached is withstood and contained by the structure of tee assembly 100 that permits such use without affecting the attachment of the flange portion 159 to the conduit portion 90 and also distributes such stress over the full length (from bell 92 to bell 93) of the central portion 97.

FIGS. 15 and 16A, 16B, and 16C show the action of the wall structure in the tee assembly 100 because of the permitted flexing of the lower wall portion 122 of the central portion 97 when there is axial movement of the tee assembly 100 relative to the branch line 106 and an angular relation other than a right angle between the axis 81 of the stem portion 80 and the axis 91 of the conduit portion 90 because the wall portion 122 of the central portion 97 can accommodate such distortion without damage notwithstanding there is stress on the flange portion 159 of the stem portion 80 in such situation.

Figure 18:
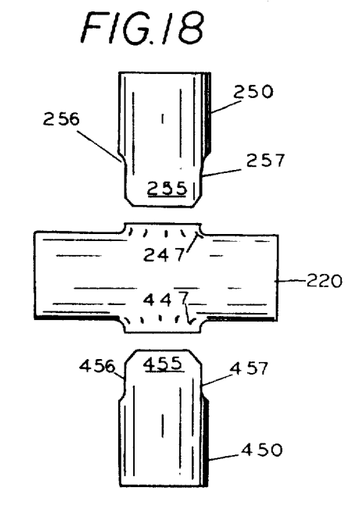
FIG. 18 is a side and expanded view of components used in manufacture of a cross 300 according to this invention.
Figure 19:
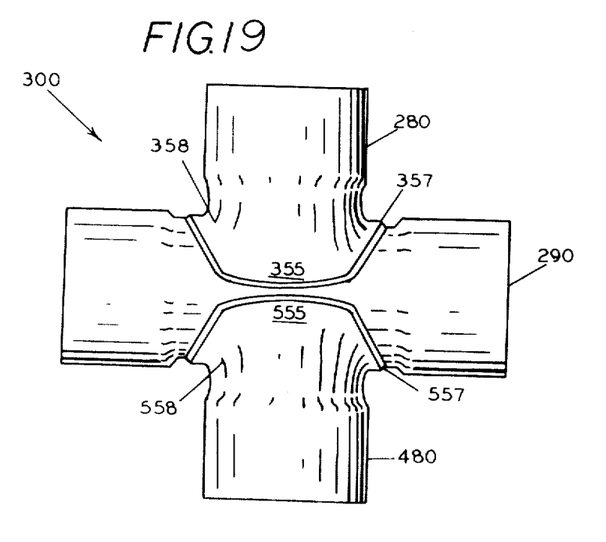
FIG. 19 is a side view of a cross 300 according to this invention.

The above described procedure is also used to form a cross 800 as shown in FIGS. 18 and 19. In this procedure a unit 250 (corresponding to stem unit 50), provided with a rear mouth 258, front mouth 257 (corresponding to mouth 57 and 58 of stem unit 50) and also with a right leg 255 (shown in FIG 18) and left leg (not shown), is joined to a conduit unit 220 (corresponding to the above described shaped conduit unit 72 with a sput 247 (corresponding to the sput 47 hereinabove described) and, also, a unit 450 (corresponding to the stem unit 50) (shown in FIG. 18) and having a rear mouth 458 and a front mouth 457 and a left leg portion 455 (corresponding, respectively to the mouths 58 and 57 and leg 55 of the stem unit 50) are formed on the portion of conduit unit 220 which is provided with a sput 447 (corresponding to 47). The sputs 247 and 447 are formed as above described for the sput 47 and the flange portions 355, 356, (not shown) 357 and 358 are developed in the same manner as units 250 and 450 as described flange lips 155 - 158 on the unit 50 (the flange portion 555, 557, 558 on the unit 480 is similarly developed on the unit 450 in the same manner as above described for the stem unit 50). Thereafter the units 280 and 480 are joined to the conduit unit 220 as above described for the joining of the shaped stem unit 73 to the shaped conduit unit 72 following the application of cement as above described for tee assembly 100 to the matching surfaces formed by the units 250 and 450 on the conduit unit 220. This provides a cross, the structural characteristics of which are as above described for the tee assembly 100.

Legs 55 and 56 (shown in FIG. 8) are of the same size and shape and mouths 57 and 58 (shown in FIG. 7) are of the same size and shape. Leg 55 (like 56, 256 (not shown) 255, 455 and 456 (not shown)) is mirror symmetrical about plane 12B—12B and mouth 57 (like 58, 257, 256, 456 and 457) (shown in FIG. 18) is mirror symmetrical about plane 12B—12B. The sput portion 47 projects 2 inches for a 10 inch o.d. thermoplastic pipe and, in other sizes, from 4 to 12 inch o.d., 1/5 of the pipe diameter or 1 inch, whichever is greater, so that the collar 66 may firmly clamp the shaped stem portion 73 to such sput during quenching for wall thickness in range of ⅛ to ½ inch, the transition portion 70 of the shaped conduit unit 72 has a minimum curvature (at top of wall 22 as shown in FIG. 4) of ¼ inch or the full wall thickness, whichever is greater, for a smooth curvature for stretching of the sput, as 47, and for stretching and shaping therewith the shaped stem unit as 73. Other curvatures for different size conduits at the transition zone thereof are set out in Table I.

The apparatus 96 provides not only that the shaped conduit unit 72 is rapidly and reliably held and formed while it is formable but also that such unit after being formed is, while held in the position of parts desired immediately quenched (in vat 125) to harden and keep the shape of that shaped conduit unit without additional manipulation of delay.

Also, the same apparatus 96 permits that the shaped stem unit 73 is not only rapidly and reliably formed, but also, immediately after its formation (by shaping on cool unit 72 while the legs 55 and 56 of the stem unit 50 are warm and readily shaped), is immediately clamped by plates 207 and 208 and, while firmly held in such position of formation, quenched without further delay or manipulation to maintain its shape.

Hydraulic control is used to manipulate the pistons 139 and 39 because of the very delicate movement obtainable thereby as well as because of the large amount of power provided therethrough.

Each hydraulic control valve, as 113 and 114, comprises a movable valve body or spool 232 which is operatively connected to and very delicately adjustable by a handle, as 233 relative to the valve casing as 234; travel of body 232 is about 0.4 inch from full open to full close.

The very gradual movement of the hydraulic control valve allows "cracking" or very small flow of hydraulic fluid to cylinders 138 and 168 as needed for close control over the movement of stem unit 50 on shaped conduit unit 72 and very close control of upward movement of mandrel 33 during formation of the sput 47.

Dimensions of apparatus 96 are given in Table V herebelow.

The hydraulic lines as 116' and 116" are very long flexible hoses and, being slightly distensible, provide sufficient resiliency to minimize shock to mandrel 33 and plate 65 and the plastic elements as tube 20 and unit 50 attached thereto on initial upward and downward movement, respectively, of piston arm 39.

The glueing frame 240 comprises (a) a rigid yet light hollow rectangular prism framework formed of angle iron members as 241-250 of, e.g. 1 × 1 × ⅛ inches steel, firmly joined as shown in FIG. 11B, with (b) a vertically adjustable screw 252 with a handle 253 therefor fixedly attached to the top thereof and a clamp plate 254 at bottom thereof rotatably held thereto and with a larger diameter than the top of stem unit 73 and (c) a seating jig 256 like jig 61 of FIG. 9 which fits the bottom of conduit unit 72. A seating jig 61 shown in FIG. 9, with supports 62 and 63 longitudinally located beyond the outline of the stem unit, is used for holding crosses while they are assembled. The screw 252 is firmly seated in a seat 257 therefor in the top of the frame 240 and the seat assembly as 256 is firmly attached to the bottom of the frame 240. The plate 254 holds the shaped stem unit 73 to the conduit unit 72 after glue is applied thereto and while the glue sets. Removable and adjustable side clamps 261 and 262 on each side of the frame 240 bear on flanges as 155 and 156 while the glue sets between units 72 and 73.

TABLE IV

PROPERTIES OF PLASTIC PIPE MATERIAL USED

| Mechanical properties | | ASTM test | Temp °F. | PVC I | PVC II | ABS I | ABS II |
|---|---|---|---|---|---|---|---|
| Tensile strength, 1000 | p.s.i. | D638 | 73.4 | 7 | 6 | 5.1 | 8 |
| Tensile modulus, | do. | D638 | 73.4 | 410 | 320 | 230 | 350 |
| Compressive strength, | do. | D695 | 73.4 | 9.6 | 8.3 | 6.4 | 10 |
| Flexural strength, | do. | D790 | 73.4 | 14 | 11 | 7.8 | 12 |
| Impact strength, | | | | | | | |
| (Ft.-lb./in. of notch) | | D256 | 73.4 | 1.0 | 14 | 8.5 | 4.5 |
| (Ft.-lb./in. of notch) | | D758 | 32 | 0.45 | 1.5 | 2.2 | 1.8 |
| (Ft.-lb./in. of notch) | | D758 | −40 | 0.3 | 0.5 | 2.5 | 0.7 |
| Thermal properties | | | | | | | |
| Specific gravity | | D792 | | 1.38 | 1.38 | 1.35 | 1.04 | 1.06 |
| Water absorption, % increase | | | | | | | |

TABLE IV—Continued

PROPERTIES OF PLASTIC PIPE MATERIAL USED

| Mechanical properties | ASTM test | Temp °F. | PVC I | PVC II | ABS I | ABS II |
|---|---|---|---|---|---|---|
| in weight | D570 | 73.4 | 0.07 | 0.07 | 0.25 | 0.25 |
| Expansion coefficient (linear 10 in./in./ F. | D696 | | 2.9 | 5.5 | 5.6 | 4 |
| Deflection temperature (heat distortion) 264 p.s.i. | D648 | | 160 | 155 | 196 | 215 |
| 66 p.s.i. F. | D648 | | 165 | 160 | 208 | 227 |
| Flammability, in./min. | D635 | | *S.E. | *S.E. | 1.3 | 1.3 |

*SE = self extinguishing

TABLE V

Dimensions of the apparatus 96.

| | | |
|---|---|---|
| Tank 125 | Height | 30" |
| | Width, 127A-127B | 6' |
| | Depth (front to back) 126A-126B | 3'-4" |
| | Wall thickness | 12 guage |
| Mast 132 | Total height (ft.) | 8'-10" |
| | Width of web 170 (from 175 to 176) | 4" |
| | Thickness of web | ¼" |
| | Depth (front to rear) of flange 175 | 5" |
| Fixed Piston Assembly 167 | Diameter of chamber 168 | 3½" |
| | Length of chamber 168 | 14" |
| | Travel of piston 39 (inch) | 12" |
| | Thickness of shaft 39 (inch) | 1" |
| | Range of piston speed,ft./second | 0-½ |
| Movable Piston Assembly 137 | Diameter of chamber 138 | 3½" |
| | Length of chamber 138 | 22" |
| | Travel of piston 139 | 18" |
| | Thickness of piston 139 | 1" |
| Maximum Movement of Guide Frame Assembly 142 on Mast 132 | Left to right Front to rear | ⅛" Less than 1/32" |
| Hydraulic lines 115 and 116 | Pressure in p.s.i. | 1500 |
| | Diameter, outside | ⅞" |
| | Wall thickness | 3/16" |
| | Wall material | 1 wire braid cord and rubber |

We claim:
1. A plastic connector comprising a conduit portion and a stem portion,
   A. said conduit portion comprising
      a. a cylindrical wall extending parallel to the central cylindrical axis thereof from a front end to a rear end thereof, and
      b. a sput portion extending outwardly and stretched outwardly from said cylindrical wall and integral therewith and comprising
         i. an orifice on the outer end of said sput portion, and
         ii. a transition wall between said cylindrical conduit wall and said orifice, said transition wall extending forward of and rearwards of and to left side of and right side of said orifice and integral with said conduit cylindrical wall, said transition wall being curved concavely outward at its front and rear ends and the front and rear portions of said transition wall also being stretched parallel to the length of the conduit portion cylindrical wall,
   B. said stem portion comprising a cylindrical body portion and a flange portion, said body portion of said stem portion having a central longitudinal cylindrical axis and said cylindrical wall of said conduit portion having a central cylindrical axis which intersects an extension of the said axis of said body portion of said stem portion,
      the said transition wall of the conduit portion at the sides of said orifice in said sput portion being stretched in a direction parallel to the plane defined by intersection of said axis of said cylindrical conduit wall and the central longitudinal axis of the body portion of said stem portion,
   C. said flange portion of said stem portion comprising a rear lip component, a front lip component, a left side lip component and a right side lip component firmly attached to each other, the front and rear lip components extending, respectively, frontward and rearward of said orifice parallel to the length of said conduit portion and composed of material stretched transversely to the length of the conduit portion in a direction perpendicular to the plane formed by the intersection of the central cylindrical axis of the conduit wall and central longitudinal axis of the body portion of said stem portion, and said left and right lip components of said flange portion are stretched in a direction parallel to the central longitudinal axis of said cylindrical wall of said conduit portion,
      said left lip component and right lip component each extending transversely to the central longitudinal axis of the conduit wall to a lower edge of said stem portion and each such component having an inwardly concave surface, D. said orifice of said sput portion and the front and rear edges of said flange lip components and the lower edges of said stem flange portion side lip components defining the limits of a zone of contact, and E. said flange port on of said stem portion circumscribing said orifice and extending beyond said orifice of said sput portion and the front and rear lip components of said flange portion having inwardly convex curved portions and the left and right side components of said flange portion having inwardly concave curved portions, and F. said sput portion having adjacent said orifice a plurality of differently shaped exterior curved surface portions all of which contact and are firmly attached to and exactly match the interior curved surfaces of said stem portions at all points in said zone of contact G. with portions of said conduit portion cylindrical wall spaced away from said zone of contact having a greater resiliency than the portions of said wall at said zone of contact where said lip components of said stem portion and the adjacent curved transition portions of the conduit portion are firmly joined together.

2. Apparatus as in claim 1 wherein the conduit portion has an internal diameter in range of 4 inches to 12 inches and the stem portion has an internal diameter in range of 4 inches to 12 inches.

3. A plastic connector as in claim 1 comprising a conduit portion and a second stem portion, A. said conduit portion comprising
  a. a cylindrical wall extending parallel to the central cylindrical axis thereof from a front end to a rear end thereof, and
  b. a second sput portion extending outwardly and stretched outwardly from said cylindrical wall and integral therewith and comprising
    i. a second orifice on the outer end of said second sput portion, and
    ii. a second transition wall between said cylindrical conduit wall and said second orifice, said second wall extending forward of and rearward of and to left side of and right side of said second orifice and integral with said conduit cylindrical wall, said second transition wall being curved concavely outward at its front and rear ends and the front and rear portions of said second transition wall also being stretched parallel to the length of the conduit portion wall, B. said second stem portion comprising a second cylindrical body portion and a second flange portion, said second stem body portion having a central longitudinal cylindrical axis and said cylindrical wall of said conduit portion having a central cylindrical axis which intersects an extension of the said central longitudinal cylindrical axis of said body portion of said second stem portion, the said second transition portion wall of the conduit portion at the sides of the second orifice in said conduit portion being stretched in a direction parallel to the plane defined by intersection of said axis of said cylindrical conduit wall and the central longitudinal axis of the body portion of the second stem portion, C. said flange portion of said second stem portion comprising a second rear lip component, a second front lip component, a second left side and a second right side lip component firmly attached to each other, the second front and second rear lip components extending, respectively, frontward and rearward of said second orifice parallel to the length of said conduit portion and composed of material stretched transversely to the length of the conduit portion in a direction perpendicular to the plane formed by the intersection of the central cylindrical axis of the conduit wall and the central longitudinal axis of the body of said second stem portion, and said second left and second right lip components of said second flange portion are stretched in a direction parallel to the central longitudinal axis of said cylindrical wall of said conduit portion, said second left lip component and second right lip component each extending transversely to the central longitudinal axis of the conduit wall to a lower edge of said second stem portion and each such component having an inwardly concave surface, D. said second orifice of said second sput portion and the front and rear edges of said second flange lip components and the lower edges of said second flange side lip components defining the limits of a second zone of contact, and E. said flange portion of said second stem portion circumscribing said second orifice and extending beyond said orifice of said second sput portion and its front and rear lip components having inwardly convex curved portions and the left and right side components of said flange portion of said second stem portion having inwardly concave curved portions, F. and said second sput portion having adjacent said second orifice a plurality of differently shaped exterior curved surface portions all of which contact and are firmly attached to and exactly match the interior curved surfaces of said second stem portion at all points in the said second zone of contact.

4. Apparatus as in claim 3 wherein the conduit portion has an internal diameter in range of 4 inches to 12 inches and each of the stem portions has an internal diameter in range of 4 inches to 12 inches.

* * * * *